United States Patent [19]
Ward

[11] Patent Number: 5,320,219
[45] Date of Patent: Jun. 14, 1994

[54] COMPACT DISC IDENTIFICATION KIT

[76] Inventor: David Ward, P.O. Box 3226, Blue Jay, Calif. 92317

[21] Appl. No.: 87,600

[22] Filed: Jul. 2, 1993

[51] Int. Cl.$^5$ .......................................... B65D 71/00
[52] U.S. Cl. ................................... 206/224; 206/310; 206/459.5; 206/313; 101/35; 101/23
[58] Field of Search ............ 206/223, 224, 229, 459.5, 206/307, 309, 310, 311, 312, 313; 101/35, 41; 400/23

[56] References Cited

U.S. PATENT DOCUMENTS

| | | | |
|---|---|---|---|
| 3,481,452 | 12/1967 | Pickios | 206/224 |
| 4,406,368 | 9/1983 | Hermes | 206/224 X |
| 4,499,994 | 2/1985 | Rentch | 206/223 X |
| 4,807,744 | 2/1989 | Chiou | 206/223 X |
| 4,836,381 | 6/1989 | Edwards et al. | 206/223 X |
| 5,101,970 | 4/1992 | Turner | 206/223 |

*Primary Examiner*—Paul T. Sewell
*Assistant Examiner*—Jacob K. Ackun, Jr.
*Attorney, Agent, or Firm*—Hawes & Fischer

[57] ABSTRACT

A compact disc identification kit includes a base portion supporting an alignment post and a soft material surrounding the alignment post for the purpose of supporting and protecting a compact disc. A stamp pad support has a bore fittable over the alignment post to enable centering of the stamp pad, in this case an annular stamp ring, with respect to the compact disc. A stamp accommodation depression enables the mounting of the stamp pad support in the kit and about the alignment post when the kit is not in use.

13 Claims, 3 Drawing Sheets

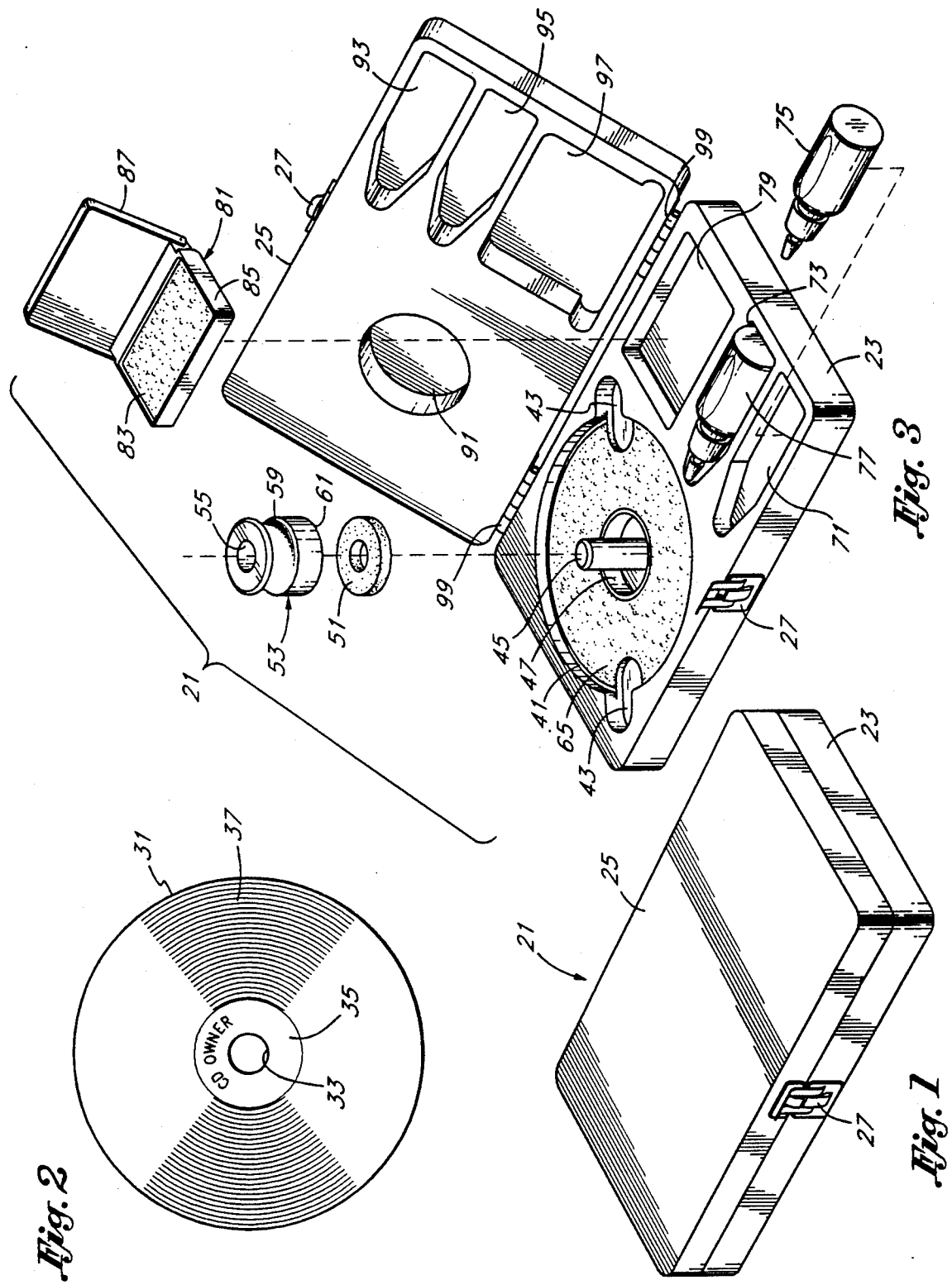

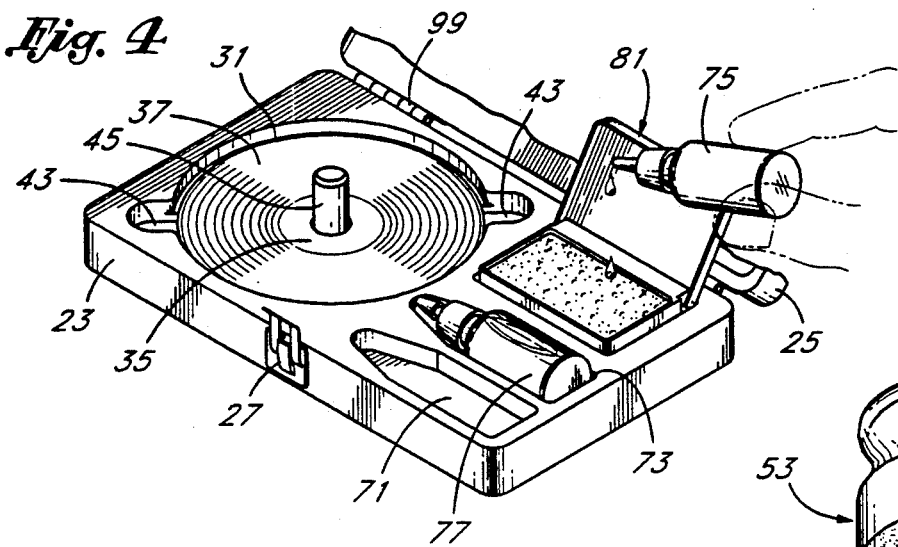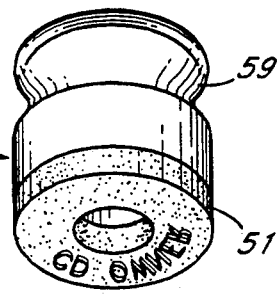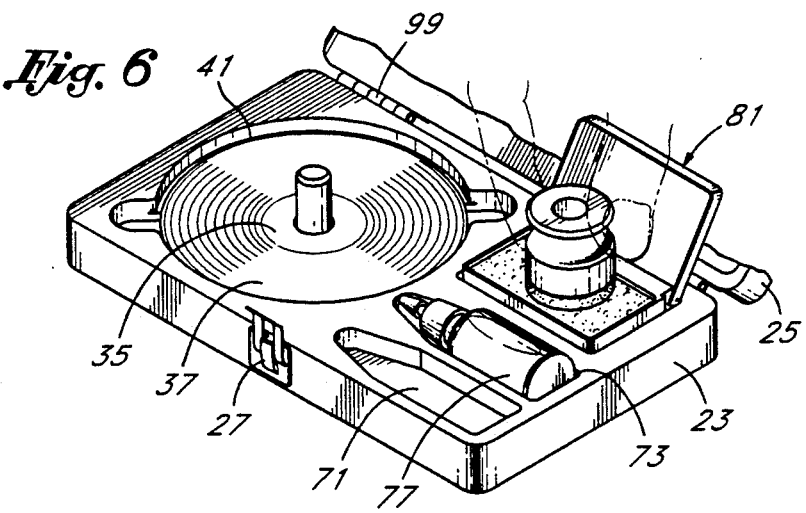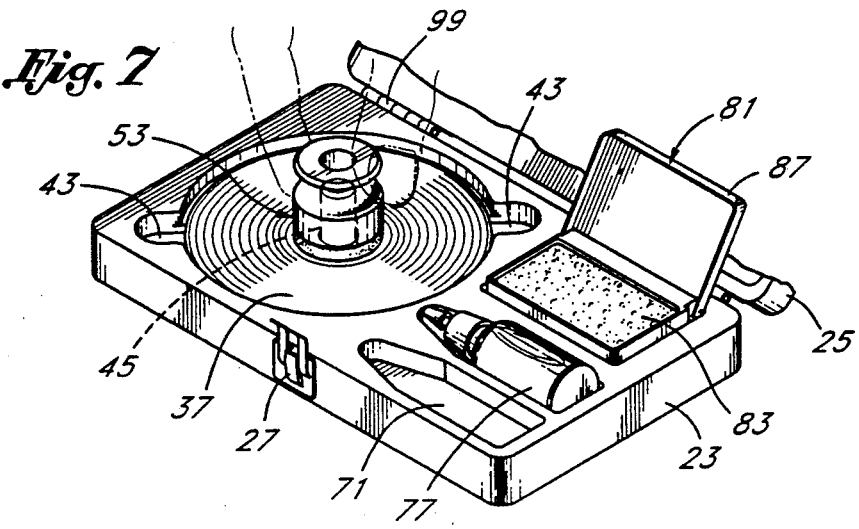

COMPACT DISC IDENTIFICATION KIT

BACKGROUND OF THE INVENTION

This invention relates to an apparatus and method for personalizing individual compact discs. More particularly, the invention relates to a self contained method and kit which facilitates the quick, easy marking of compact discs in a manner which not only helps to keep track of the component parts used for marking, but which also provides a structure for gently and safely supporting a compact disc and aligning the disc with its identification stamp.

Compact discs are polymer coated metallic, generally flat, annular discs of material in which a series of pits have been formed. The pits are typically a half wave length deep in order to permit a finally tuned laser to determine the existence of the pits. The existence of the pits are determined rapidly in a "reading" of the compact disc. Compact discs are used for storing data, music, and even video signals.

Typically the plastic coating of a compact disc can withstand some abuse without a serious degradation of the quality of the "read." However, especially where the compact disc is one of which a musical performance is recorded, it is important to attempt to insure that the compact discs are treated in such a way that they will not be scratched, nicked or cut.

Compact disc owners are known to treat their compact discs with extreme care, to ensure that even the smallest of nicks, scratches and marks will not occur on the plane surface.

Further, it is also undesirable to cause of a compact disc to deviate from its intended condition of planarity. Compact discs spin quite rapidly in the plane devices. Given that the pits which are "read" are only one half of a wave length deep, any warping of the compact disc on the order a quarter of a wave length could cause serious problems. These problems would relate to the reading of the compact disc, in addition to potential damage to the compact disc players.

Compact discs containing musical performances cost significantly more than cassette tapes. It is not unusual for compact discs to range in price from about $15-25. For the serious audio file, having a music library of several hundred compact discs can be quite costly. The cost and permanence of compact discs enhance their value as a long lasting asset. Because of the value of a library compact discs and their potential loss to the owner, it is desirable to permanently mark the discs with the identity of the owner to both deter the likelihood of their being taken during a crime and to permit identification and recovery of the compact discs one the crime has occurred.

The marking of the compact disc storage box would be easily accomplishable, but would not seriously deter theft since the storage box could be easily discarded. On the compact disc itself, the only area of any portion which is available for marking is a small annular area adjacent the central aperture in the compact disc. The potential exists for etching away a portion of the plastic covering, such as with a vibrating pin, in order to mark the compact disc. However, such a method produces a marking which is not to readily seen at first glance and the pressure of the vibrating pin may warp or bend the disc.

One other method which has shown some promise is the use of heat to form an impression stamp on the inner most annular area of the compact disc. However, remembering that compact discs are of laminate construction having a layer of metal sandwitched between two layers of plastic, it is readily apparent that heating could cause the compact disc to warp. Such a process is not easy to control. Even if the temperature of the "brand" were controlled, there would be a corresponding need to control both the duration and pressure with which the identifying branding iron was impressed into the compact disc. Further, although an impression "brand" could be obtained, it still may not be as readily visually apparent since the material forming the impression is clear plastic.

What is therefore needed is a method for marking compact discs in which the disc can be treated in a very gentle manner so as not to spoil the read surfaces of the compact disc. The needed method should not involve heat, which always runs the risk of warping the disc, and should not involve undue pressure or vibration on the disc. Further, the method of identification should be one which is readily observable and sufficiently permanent so that it cannot be removed by individuals who misappropriate the compact discs. It is also desirable that the physical attribute of the system used to mark the compact disc be one that is not costly or complex and which is not given to failure through the loss of one or more of its component parts.

SUMMARY OF THE INVENTION

A compact disc identification kit includes a base portion supporting an alignment post and a soft material surrounding the alignment post for the purpose of supporting and protecting a compact disc. A stamp pad support has a bore fittable over the alignment post to enable centering of the stamp pad, in this case an annular stamp ring, with respect to the compact disc. A stamp accommodation depression enables the mounting of the stamp pad support in the kit and about the alignment post when the kit is not in use.

BRIEF DESCRIPTION OF THE DRAWINGS

The benefits and advantages of the present invention will be best shown with reference to the drawings of which:

FIG. 1 is a perspective view of the compact disc identification kit of the present invention;

FIG. 2 is a plan view of a compact disc illustrating the annular area which may be marked and showing the designation "CD owner";

FIG. 3 is a perspective view of the compact disc identification kit shown in FIG. 1, but in an open position and showing and exploded relationship of its component parts;

FIG. 4 illustrates the inking of the pad included with the compact disc identification kit of FIGS. 1 and 3;

FIG. 5 is a perspective view of the underside of the stamper of the compact disc identification kit which was shown in FIG. 3;

FIG. 6 illustrates the application of ink to the stamper shown in FIG. 5;

FIG. 7 illustrates the stamper of FIG. 5 being used to stamp a compact disc supported by the kit shown in FIGS. 1, 3, 4 and 6;

DETAILED DESCRIPTION OF THE PREFERRED EMBODIMENT

Figure 8:
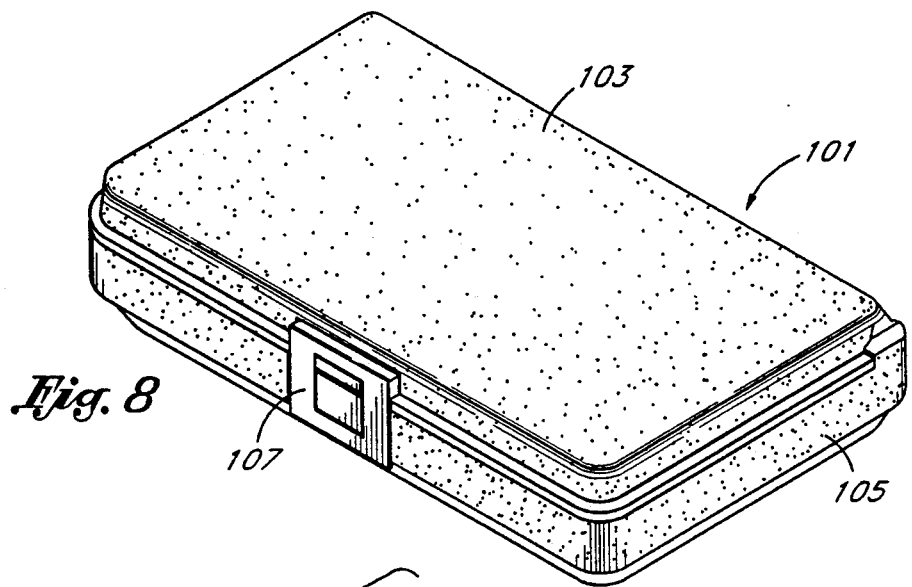
FIG. 8 is a perspective view of a second embodiment of the compact disc identification kit utilizable in conformance with that shown in FIGS. 1-7.

Referring to FIG. 1, a compact disc identification kit 21 is shown in perspective. Kit 21 includes a base 23 enclosed by lid 25. Base 23 and lid 25 may each be machined from a solid block of wood. A latch 27 holds the lid 25 and the base 23 in a closed position. Referring to FIG. 2, a plan view of a typical compact disc 31 clearly shows a central aperture 33. Adjacent aperture 33 is a clear area 35, which is the area in which the compact disc 31 may be marked for identification. The term "CD Owner" appears in the clear area 35 and is illustrative of the result which may be produced by the use of the method and kit 21 of the present invention. Adjacent the clear area 35 is the data area 37. It is the data area 37 which is of most concern to the owner of the compact disc 31. The data area 37 should not be scratched, marked or bent either before or after the marking procedure.

It is understood that the clear area 35 could be marked with any pattern, design, or lettering of any language to identify the disc. Such marking in clear area 35 can be of virtually any pattern which may be formed with a rubber or silicone stamp. To avoid marking the data area 37, the compact disc may be handled by its outer edge.

Referring to FIG. 3, the kit 21 of FIG. 1 is shown in the open position, but without the presence of compact disc 31. The features of the kit 21 shown in FIG. 3 include, in base 23, a circular depression 41 having a diameter slightly larger than the outer diameter compact disc 31. At the opposite periphery of the circular depression 41 are the finger depressions 43 which permit manual engagement of the outer edge of compact disc 31 once it is placed in the circular depression 41. At the center of circular depression 41 is an alignment post 45 which has an outer diameter slightly less than the aperture 33 of compact disc 31 sufficient to allow compact disc 31 to be slottedly fitted about alignment post 45. The closeness of fit of alignment post 45 and aperture 43 is sufficient to properly align compact disc 31 but not so loose as to allow an excess of "play" between these two members.

Immediately surrounding the alignment post 45 is a stamp accommodation depression 47. Depression 47 has an outer diameter very nearly the diameter the clear space 35 of the compact disc 31. Shown immediately over the alignment post 45 is an annular stamp ring 51, and above it a stamp support 53. Stamp support 53 has a central bore 55, a curved perimeter 59 and a bottom surface 61. Typically the annular stamp ring 51 is fitted with an adhesive which allows it to be applied to the stamp support 53. Such an adhesive may be applied initially to the annular stamp ring 51, and transported with a peel and stick surface (not shown). The alignment post 45 can be used to assist in applying the annular stamp ring 51 to the stamp support 55, by placing the annular stamp ring 51 on the alignment post 45 and then pressing the stamp support 53 onto the alignment post 45 and downwardly to engage the stamp ring 51. The accommodation depression 47 is intended to completely accommodate the assembly formed by the annular stamp ring 51 and stamp support 53 in a carrying position when no compact disc 31 is present in circular depression 41. In effect, accommodation depression 47 forms the carrying space for the stamp support 53 and its annular stamp ring 51 when not in use.

The areas between the accommodation depression 47 and the outer diameter of the circular depression 41, and excluding the finger depressions 43 is covered by a soft felt material 65. As it will be shown, this soft felt material 65 acts to further protect the compact disc 31. The soft felt material 65 is solidly supported by the base 23.

To one side of the circular depression 41, a first ink supply bottle well 71 and a second ink supply bottle well 73 is shown supporting a first ink supply bottle in supply bottle 75 and a second ink supply bottle 77. Adjacent the second ink supply bottle well 73 is an ink pad depression 79. Ink pad depression 79 is somewhat rectangular shaped and mates with the bottom surface of an ink pad 81 shown in exploded style above the kit 21. Ink pad 81 includes a bed of ink absorbent material 83 supported by an ink pad base 85, and covered with an ink pad lid 87.

Lid 25 contains a variety of depressions which mate with some of the structures and depressions of the base 23. Lid 25 includes a stamp support depression 91 which will be located opposite the stamp support 53 once the stamp support 53 is mounted on the alignment post 45 and the lid 25 is closed upon the base 23. Similarly, there is a first upper first ink supply bottle well depression 93, and a second upper ink supply bottle well depression 95, and an upper ink pad depression 97. The kit shown in FIG. 3 can be carried in the closed position in FIG. 1 without losing, damaging or causing damage to the stamp support 53, its annular stamp ring 51, and the first and second ink supply bottles 75 and 77 and the stamp pad 81. Also shown in FIG. 3 are a set of two hinges 99 which enable the base 23 and lid 25 to be pivotly actuated to eachother to open and close the kit 21.

Referring to FIG. 4, the first steps in use of the kit are illustrated. First, the compact disc 31 to be marked is placed over the alignment post 45 and brought to rest within the circular depression 41 and on the smooth felt material 65. Next, ink from the first ink supply bottle 75 is applied to the bed of ink absorbing material 83 in the stamp pad 81. The preferable ink to use for the kit 21 is an epoxy ink which is preferably activated by its exposure to air. Such a material enables the quick and easy correction of mistakes immediately after an application mistake, such as within 10 minutes of application of an identifying mark. This ink may be easily removed within the 10 minute period with isopropyl alcohol. However, once the ink has dried, it cannot be easily removed, usually without damaging of the overlying plastic in the clear area 35 of the compact disc 31.

Initially about 75 to 80 drops of the epoxy ink from ink supply bottle 75 is applied to the bed of ink absorbing material 83 of the stamp pad 81. Subsequent uses of the kit 81 will require less ink, since the bed of ink absorbing material 83 may be partially saturated at that time. Referring to FIG. 5 the stamp support 53 is shown with the annular stamp ring 51 attached. Note that on the underside of the annular stamp ring 51 are the mirror image of the words "CD Owner." This corresponds to the term "CD Owner" which was shown on the clear area 35 of compact disc 31 of FIG. 2.

Referring to FIG. 6, the stamp support 53 is grasped and with the attached annular stamp ring 51 manually pressed into th bed of ink absorbing material 83 of stamp pad 81. Note that the compact disc 31 is currently in position for identification marking.

Referring to FIG. 7 the application of the stamp support 53 to the compact disc 31 is shown. Once the annular stamp ring 51 is wetted with ink, the stamp support 53 is brought over the alignment post 45 such that the alignment post 45 passes through and aligns with the central bore 55 in the stamp support 53. The alignment of the alignment post 45 within the central bore 55 insures that the annular stamp ring 51 will be aligned with the clear area 35 and that the ability to, even accidentally, allow the annular stamp ring 51 to "skid" sideways, is eliminated. As can be seen in FIG. 7, and the prior figures, the clear area 35 of the compact disc 31 is so well supported by the felt material 65 of the circular depression 41 that the compact disc 31 does not have the ability to warp, or become damaged from any pressure which is brought to bear upon the compact disc 31 through the stamp support 53.

Further, since an epoxy, contact surface ink is used, it is not necessary to produce very much downward force onto the stamp support 53. Typically in a stamping operations, force may be used to compensate for the lack of alignment between the stamping structure and the object to be stamped. However, it is clear that in the case of the kit 21 that alignment is readily had, thus eliminating the necessity for undue pressure on the annular stamp support 53. Once the impression of the annular stamp ring 51 and its supporting stamp support 53 shown in FIG. 7 has been accomplished, those structures may be then gently lifted and set aside. The compact disc 31 may be removed using the finger depressions 43 on either side of the circular depression 41, the compact disc 31 then being left to dry assuming that a good impression had been made. The stamp support and its annular stamp ring may then be cleaned of excess ink and returned to the alignment post 51 for storage in the accommodation depression 47. The kit 21 may then have its lid 25 closed over its base 23 and using latch 27 until further needed. One of the advantages of kit 21 is that it may be readily used to imprint hundreds of compact disc 31 at a time, or simply one at a time without burdensome set up and assemblage of materials.

Referring to FIG. 8, a second embodiment of the compact disc identification kit of the present invention is shown and referred to as kit 101. Kit 101 may typically be molded from one or more pieces of plastic, and may have a non-smooth exterior. As shown, kit 101 has a lid 103 closing onto a base 105 and having a latch 107 which is formed integrally with the lid 103. Latch 107 is originally attached to the lid 103 and operates through its ability to bend.

Figure 9:
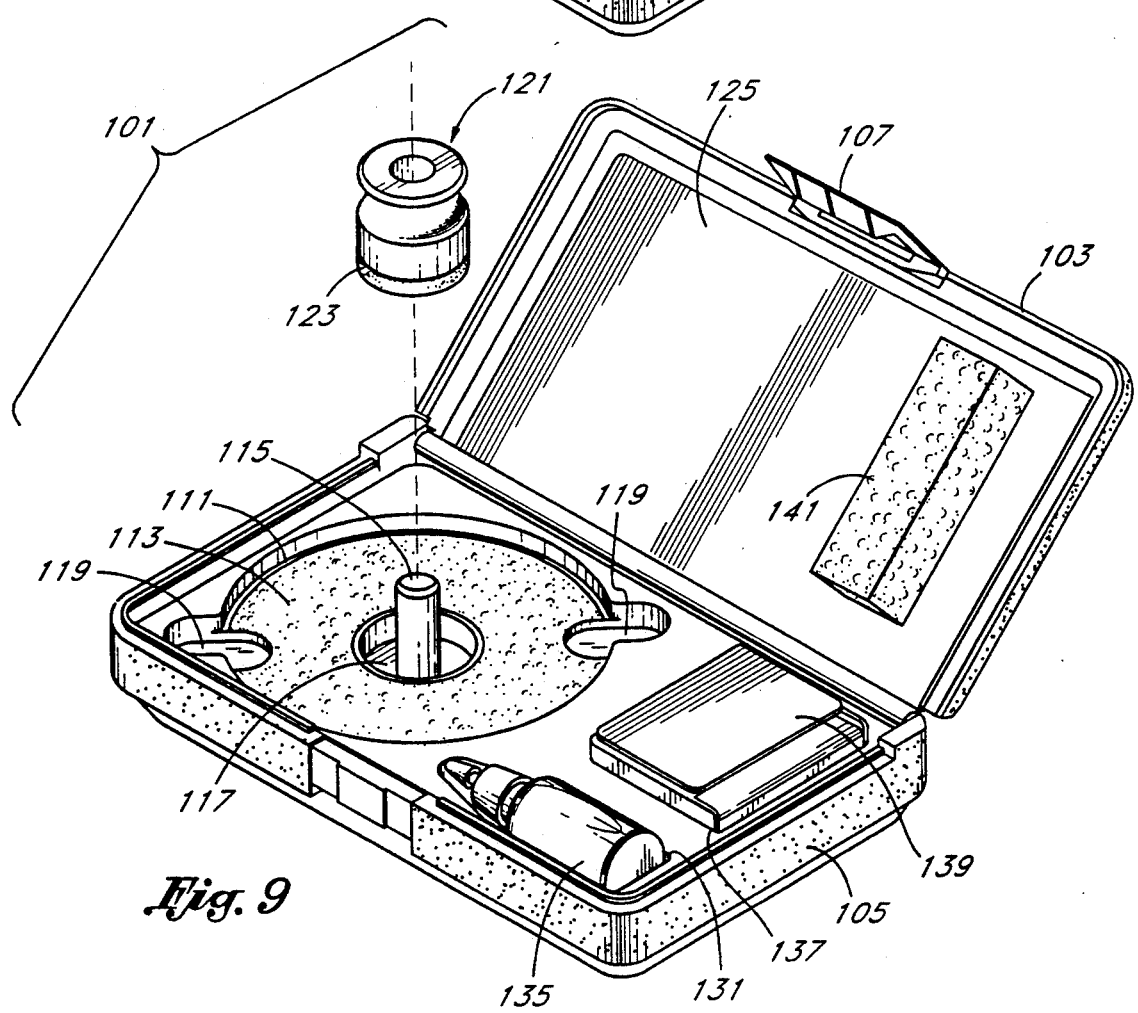
FIG. 9 is a perspective view of the second embodiment of the compact disc identification kit shown in FIG. 8, but in open position and illustrating the component parts.

Referring to FIG. 9, an open view of the kit 101 illustrates an interior lacking the depressions of the compact disc identification kit 21 of FIGS. 1–7. In this instance, the base 105 contains a circular depression 111 with its soft felt material 113. An alignment post 115 is also surrounded by an accommodation depression 117. The outer periphery of the circular depression 111 is also bounded by a pair of finger depressions 119. Above the alignment post 115 is shown the stamp support 121 with its attached annular stamp ring 123. These structures are identical in dimension to the corresponding structure shown in FIGS. 1–7. However, note that the lid 103 does not contain the corresponding stamp support depression 91 which is shown in FIG. 3. The second embodiment shown in FIGS. 8 and 9, the spacing of an inside portion 125 of lid 103 provides the required clearance in order to effectively allow the stamp support 121 to be carried when the lid 103 is closed onto the base 105. Adjacent the circular depression 41 is a single ink supply bottle well 131 supporting a single ink supply bottle 135. Base 105 also has an ink stamp depression 137 (the edge of which is shown), supporting an ink pad 139 which may be identical to the ink pad 81 shown in FIG. 3. To hold the ink pad 139 and ink supply bottle 135 in place, the inside 135 of lid 103 is provided with a foam spacer 141 which is attached to the inside 125 of lid 103 as by an adhesive, for example. When the lid 103 is closed onto the base 105, the foam spacer 141 is compressed, thus bearing against the top of the ink pad 139 and the ink supply bottle 135, thus holding them both in place. The use of the kit 101 to mark compact ID's 31 for identification is identical to those described for kit 21.

While the present invention has been described in terms of a compact disc identification kit, one skilled in the art will realize that the structure and techniques of the present invention can be applied to many appliances. The present invention may be applied in any situation where an object having a bore needs to be marked quickly and accurately.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A compact disc marking and support structure comprising:
    a base;
    an alignment post supported by said base;
    circular planar surface about said alignment post; and
    a circular planar depressed space between said circular planar surface and said alignment post
    a stamp support comprising a member having a central bore therethrough, said member fittable over said alignment post and having a generally planar annular surface with impressions thereon for marking a compact disc.

2. The compact disc marking and support structure recited in claim 1 wherein said stamp support has a curved perimeter to facilitate manual grasping thereof.

3. The compact disc marking and support structure recited in claim 1 wherein said generally planar annular surface of said stamp support is provided using an annular stamp ring attached to said stamp support.

4. The compact disc marking and support structure recited in claim 1 and further comprising a lid, pivotally engaged with said base and closeable with respect to said base, said lid being shaped to accommodate said alignment post when said lid is closed onto said base.

5. The compact disc marking and support structure system of claim 4 wherein at least one of said lid and said base has at least one depression to accommodate at least one of a stamp pad and an ink supply bottle.

6. The compact disc marking and support structure system of claim 4 wherein at least one of said lid and said base has at least a first depression to accommodate a stamp pad and at least a second depression to accommodate an ink supply bottle.

7. A compact disc marking kit, including the compact disc marking and support structure recited in claim 6, and further comprising:
   a stamp pad fittable within said first depression; and
   an ink supply bottle fittable within said second depression.

8. The compact disk marking kit as recited in claim 7 wherein said ink supply bottle is filled with an epoxy ink.

9. The compact disk marking kit as recited in claim 7 and further comprising a latch for selectably securing said base to said lid.

10. The compact disc marking and support structure of claim 5 further comprising a foam spacer located on one of said lid and said base and opposite said at least one depression.

11. A compact disc identification kit comprising;
   a base;
   an alignment post supported by said base;
   a circular planar surface supported by said base and adjacent said alignment post;
   a stamp support comprising a member having a central bore therethrough, said member fittable over said alignment post and having a generally planar annular surface with impressions thereon for marking a compact disc;
   lid means, supported by said base, for selectably enclosing said alignment post and said stamp support.

12. The compact disc identification kit of claim 11 wherein said lid means forms an enclosure with respect to said base.

13. The compact disc identification kit of claim 12 further comprising;
   an ink supply bottle fittable within said second depression, said stamp pad and said ink supply bottle are fittable within said enclosure.

* * * * *